United States Patent
Meier et al.

(10) Patent No.: US 10,965,492 B2
(45) Date of Patent: Mar. 30, 2021

(54) METHOD FOR TRANSMITTING DATA PACKETS, CONTROLLER AND SYSTEM HAVING A CONTROLLER

(71) Applicant: Volkswagen Aktiengesellschaft, Wolfsburg (DE)

(72) Inventors: Alexander Meier, Wolfsburg (DE); Olaf Krieger, Lostau (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/733,270

(22) PCT Filed: Dec. 17, 2018

(86) PCT No.: PCT/EP2018/085271
§ 371 (c)(1),
(2) Date: Jun. 19, 2020

(87) PCT Pub. No.: WO2019/121549
PCT Pub. Date: Jun. 27, 2019

(65) Prior Publication Data
US 2020/0322180 A1    Oct. 8, 2020

(30) Foreign Application Priority Data

Dec. 19, 2017 (DE) ............. 10 2017 130 547.5

(51) Int. Cl.
*H04L 12/28* (2006.01)
*H04L 12/40* (2006.01)
(Continued)

(52) U.S. Cl.
CPC ....... *H04L 12/40163* (2013.01); *H04L 47/10* (2013.01); *H04L 47/6275* (2013.01);
(Continued)

(58) Field of Classification Search
CPC  H04L 12/40163; H04L 47/6275; H04L 47/10
See application file for complete search history.

(56) References Cited

U.S. PATENT DOCUMENTS

| 6,038,230 A | * | 3/2000 | Ofek .............. H04L 12/6418 370/389 |
| 9,585,053 B2 | | 2/2017 | Scheffel |

(Continued)

FOREIGN PATENT DOCUMENTS

| DE | 102012000188 A1 | 7/2013 |
| EP | 3151475 A1 | 4/2017 |

(Continued)

*Primary Examiner* — Elisabeth Benoit Magloire
(74) *Attorney, Agent, or Firm* — 2SPL Patent Attorneys PartG mbB

(57) ABSTRACT

The invention relates to a method for transmitting at least one data packet from a first communication participant via a transfer channel shared with at least one further communication participant, wherein data packets are transmitted by the communication participants according to a Round-Robin method. The method comprises receiving by the first communication participant of at least one data packet from the at least one further communication participant via the shared transfer channel, wherein the further communication participant is configured to transmit data packets of different priority values, and determining a priority value from the data packet assigned to the further communication participant. The method comprises a transmission of the data packet by the first communication participant via the shared transfer channel depending on the priority value. The invention also relates to a controller and a system as well as a motor vehicle.

16 Claims, 4 Drawing Sheets

(51) Int. Cl.
*H04L 12/801* (2013.01)
*H04L 12/865* (2013.01)

(52) U.S. Cl.
CPC ............... *H04L 2012/40215* (2013.01); *H04L 2012/40273* (2013.01)

(56) References Cited

U.S. PATENT DOCUMENTS

| | | | |
|---|---|---|---|
| 2002/0087716 A1 | 7/2002 | Mustafa | |
| 2005/0169172 A1* | 8/2005 | Wang | H04L 47/2408 370/229 |
| 2005/0243858 A1* | 11/2005 | Vitebsky | H04W 48/08 370/447 |
| 2006/0187949 A1* | 8/2006 | Seshan | H04L 49/90 370/412 |
| 2008/0273545 A1* | 11/2008 | Sgouros | H04L 45/00 370/412 |
| 2011/0044275 A1* | 2/2011 | Ishii | H04W 52/325 370/329 |
| 2011/0103316 A1* | 5/2011 | Ulupinar | H04L 47/10 370/329 |
| 2011/0200051 A1* | 8/2011 | Rivaud | H04J 3/0658 370/400 |
| 2011/0228779 A1* | 9/2011 | Goergen | H04L 49/40 370/392 |
| 2013/0208727 A1* | 8/2013 | Beecroft | H04L 45/22 370/401 |
| 2014/0341032 A1 | 11/2014 | Thaler | |
| 2015/0150009 A1* | 5/2015 | Mavroidis | H04L 47/10 718/101 |
| 2017/0339075 A1* | 11/2017 | Arad | H04L 49/9084 |

FOREIGN PATENT DOCUMENTS

| | | |
|---|---|---|
| WO | 03063428 A1 | 7/2003 |
| WO | 2016110326 A1 | 7/2016 |

* cited by examiner

METHOD FOR TRANSMITTING DATA PACKETS, CONTROLLER AND SYSTEM HAVING A CONTROLLER

The present invention relates to a method for transmitting data packets by a first communication participant via a transfer channel shared with at least one further communication participant. The invention further relates to a controller configured to perform the method as well as a system with at least one controller.

In vehicles, a networking technology may be provided for a communication of vehicle devices, for example an Ethernet connection with a data rate of 10 Mbit/s may be provided to be employed in vehicles. Here, a transfer channel that is used commonly or shared by multiple communication participants (a so-called "shared medium") may be employed. Only a maximum of one network participant may transmit a data packet via such a shared transfer channel at a time.

Network participants or communication participants consist, for example, of at least a microcontroller (µC), on which, for example, an application software may be executed, and a network interface. Ethernet-based network interfaces may consist of a PHY (Physical Layer Attachment) and a MAC (Media Access Controller) component. The PHY component is responsible, for example, for impressing digital signals, such as data packets, from the MAC component onto the transfer medium or the transfer channel. Furthermore, the PHY component controls access to the transfer medium by ensuring that two participants never attempt to write onto the transfer medium at the same time.

The MAC component generates a valid Ethernet frame from the data to be transferred and hands the same over for example bit by bit (e.g. four bits in parallel) to the PHY component for transfer as soon as it signals that it has the right to write onto the transfer medium. Messages from other participants may be read by the PHY component and transferred bit by bit to the MAC component. The MAC component may compose a receive Ethernet frame therefrom and decide whether the packet was determined for the same and should be further processed or whether it may be discarded.

MAC components of a communication participant are known which have multiple transmit and receive queues with different priorities. A scheduler (planner) within the MAC component defines the queue from which the first element, i.e. the element to be transmitted next, is taken in order to be transferred. For real-time systems such as open-loop and closed-loop control systems in the vehicle, a so-called strict priority scheduler may be used for this purpose. The result is that the messages with the highest priority are always transferred first and only when there are no more high-priority packets (i.e. packets with high priority) in the queue of the MAC component, packets from the queue with the next lower priority are transferred.

The PHY component is configured for write access to the common transfer medium. In order to avoid collisions that would occur in case of simultaneous write access to the transfer medium by multiple participants, a collision avoidance method is needed. For use in 10 Mbit/s Automotive Ethernet, a method PLCA (PHY Level Collision Avoidance) is known, for example. In this method, each participant has a dedicated time window in which it is the only one that is allowed to transmit data. When the transmission operation is completed or the participant has not started transmitting within a predetermined period of time, it is the next participant's turn. After all participants have had the possibility to transmit a frame or a data packet, the communication cycle starts again. This may ensure that all communication participants have equal rights to transmit data packets via the shared transfer channel.

A network control is shown in US 2016 0373362 A1. The network control may have a transmission circuit that is configured to transmit packets based on an adapted priority.

US 2014 0341032 A1 shows a device with two paths A and B, each of which may process data transfer blocks of different priorities. The device may support prioritized communication of highly prioritized data. For this purpose, the device may interrupt a communication of lower priority packets in order to transmit higher priority packets. This means that the device may transmit its data in order of priority.

US 2008 0071924 A1 shows a transmit node which may transmit a low-priority packet. The transmit node may interrupt the transmission of the low-priority packet if a high-priority packet is available for transmission at the transmit node. When all high-priority packets are transmitted, the transmit node may continue transmitting the low-priority packet.

Thus, in a vehicle, a first communication participant may transmit data packets of different priorities in turn. Here, the first communication participant may transmit data packets, for example if a second communication participant does not transmit any data packets. This may result in the disadvantage that the shared transfer channel is temporarily occupied by data packets of the second communication participant and data packets of the first communication participant cannot be transmitted immediately, since the second communication participant has for example the same authorization as the first communication participant with regard to a transmission time window intended for it. This may have the disadvantage that there may be a certain time delay until data packets of the first communication participant may be transmitted via the transfer channel.

While the transmission of data packets by multiple communication participants via a shared transfer channel is described above purely as an example using a motor vehicle, communication participants may also use a shared transfer channel in another context, for example in a field of general automation technology or in a field of home automation.

A method for transferring data packets in a communication network of synchronized nodes via a predetermined path in the communication network is known from U.S. Pat. No. 9,585,053 B2. Here, communication nodes transmit respective data packets into the predetermined path simultaneously, i.e. at a specific time.

A network device which may implement a protection band to reduce latency during transfer of high-priority data is known from US 2014 341 032 (A1). The network device may identify a scheduled communication time for high-priority data.

The task of the invention is to improve a method for transmitting data packets via a transfer channel shared by multiple communication participants.

The task is solved according to the independent claims. Advantageous further developments of the invention are described in the dependent claims, the following description as well as the figures.

One aspect of the invention relates to a method for transmitting at least one data packet by a first communication participant via a transfer channel shared with at least one further communication participant. Data packets are transmitted by the communication participants, i.e. by all communication participants transmitting via the shared transfer channel, according to a Round-Robin method. That is to say that in a communication cycle, each communication participant is assigned a transmission window or a time slot within which it may transmit a data packet. In case a communication participant does not transmit any data packet within the time slot assigned to it, the next communication participant within a series of the communication cycle may transmit its data packet. For example, a first communication participant and at least a second communication participant are connected to the transfer channel. The communication participants are connected to the transfer channel for example by means of a respective PHY component in order to transmit and receive data packets via the same. An example of a shared transfer channel may be a communication bus via which an Ethernet connection is provided. By way of example, a 10 Mbit/s Automotive Ethernet connection may be provided. A communication method may be configured such that all communication participants in a transmission cycle obtain the right to transmit a data packet one after the other. For example, if a message of a communication participant consists of four data packets, it is possible that the communication participant may be able to transmit the message within four transmission cycles. Here, each of the communication participants may transmit data packets which have a priority value that may be contained in the data packet. Depending on the urgency of the data packet, the communication participants may insert different priority values into the data packet or transmit them together with the same. In other words, communication participants are configured to transmit data packets, each with different priority values, via the shared transfer channel.

According to the invention, the method comprises receiving of the first communication participant of at least one data packet from the at least one further (for example the second) communication participant via the shared transfer channel and determining a priority value from the data packet assigned to the further communication participant. In other words, the first communication participant receives a data packet transmitted by a further communication participant via the shared transfer channel. The first communication participant receives a data packet, for example from the second communication participant. Thus, the first communication participant is configured to receive data packets from the further communication participants. Here, it may be irrelevant whether a received data packet is intended for the first or another one of the further communication participants. The method is described merely by way of example for the first communication participant and may also be performed for the further communication participants. This is to say that, for example, also the second communication participant may receive data packets from the first communication participant and may perform the presented method analogously.

A priority value may be determined from the data packet received by the first communication participant. Each transferred data packet may contain a priority information, for example in addition to another information. For example, the Ethernet standard IEEE 802.1Q provides a 3-bit value as a priority, which may be contained in a data packet and may be determined. For example, a value 0 corresponds to a lowest priority, a value 7 to a highest priority. For example, the first communication participant may receive a data packet transmitted by the second communication participant and determine a priority of the value 7 from the same, for example.

According to the method, transmission of the data packet by the first communication participant takes place via the shared transfer channel depending on the priority value. This may mean, for example, that depending on the determined priority value, the first communication participant transmits a data packet at a certain time, for example, or it transmits the data packet only at a later time. If, for example, the first communication participant is a device that does not transmit urgent or real-time relevant messages, for example only low-priority messages (for example with the priority value 1), for example the first communication participant may omit transmitting the data packet if it has determined a priority of the value 7 from the data packet of the second communication participant. Omitting means that a communication participant does not use its assigned time window or time slot of a communication cycle although it holds a data packet ready for transmission. For example, the second communication participant may transmit data packets (which may form a message) having a high priority respectively in several consecutive transmission cycles and, from a certain point in time, transmit data packets that are less urgent and thus have a lower priority. The fact that the first communication participant omits transmitting within a time window assigned to it may result in a shortened transmission cycle (in contrast to a case in which the first communication participant also transmits), so that overall the message of the second communication participant may be transferred faster. From lower priority data packets, the first communication participant may for example determine a priority value of zero. It is possible, for example, that the communication participant transmits its data packet at the time when a transmission time window is intended for the same and if it has received a value of a priority of, for example, zero from a data packet last received from the second communication participant, i.e. if the second communication participant has transmitted its higher priority message completely and subsequently transmits messages of the same priority as the first communication participant.

The method may enable a provision of a decentralized prioritization of communication participants independent from each other that transmit data packets via a shared transfer channel. This means that communication participants having higher priority data packets for transmission are preferentially assigned the shared transfer channel or are preferentially assigned write rights for transmitting the higher priority data packets, without a central control device being required, for example for assigning a respective write right. Thus, the write rights are distributed by the communication participants among themselves depending on their priority. The advantage is that the communication participant with the highest priority may respectively be given precedence to transmit its messages or data packets without an additional transmission control device in a communication system being required. Thus, the distribution of a transfer channel capacity takes place in an efficient way and such that urgent messages are transmitted preferentially.

For example, in a first mode, three different communication participants may each transmit data packets of a same priority. In the first mode, a communication cycle may be implemented in such a way that one communication participant at a time transmits a data packet and after a predetermined transmission pause, a further communication participant transmits a data packet, so that the communication participants transmit their data packets in turn. In a second mode, for example, the second of the three communication participants may transmit a higher priority data packet. It is received by the other two communication participants and the higher priority value is determined. In this example of the second mode, a communication cycle may be organized by the method in such a way that all communication participants except the second communication participant omit transmitting data packets, so that the second communication participant may transmit its higher priority data packets, since in this case, the shared transfer channel is used by it alone. As soon as the second communication participant has transmitted all data packets of the higher priority, it may again transmit a low-priority data packet, as in the first mode. In this case, the further communication participants may determine that the second communication participant transmits data packets of the same priority as themselves and in turn transmit data packets themselves, so that the communication cycle of the first mode may be resumed.

Each participant or communication participant may observe the data on the transfer medium and store the highest observed priority value of the last communication round. This means, for example in a communication cycle with time windows that are each assigned consecutively to a communication participant: If the participant is allowed to transmit in a time window n, it evaluates the priority information from the time windows starting from n+1 of the last communication cycle (or transmission cycle) as well as the time windows up to n−1 of the current communication cycle.

For example, the priority information is determined by a PHY component of a respective communication participant. For example, the PHY component transmits its data packet only if the priority of its own packet is as high or higher than the highest observed priority of another communication participant. If the priority of the own packet is lower, a participant renounces the right to transmit and thus does not block the common communication channel with a low-priority packet. If all participants or communication participants in a network use the method according to the invention, high-priority messages may be transferred without being interrupted by low-priority packets. The advantage of this is that a prioritization may be provided system-wide, i.e. between communication participants independent from each other, without a central control device being required.

The method provided may, for example, extend existing methods in order to enforce priorities system-wide for access to the transfer medium. Therefore, it is possible that data packets of a first communication participant having a high priority may be transferred preferentially and that packets of other participants that are ready for transmission are held back by the same independently or voluntarily.

For real-time systems such as open-loop and closed-loop control systems in the vehicle, this may result in advantages. For real-time relevant data, for example, a maximum admissible latency may be observed in some examples. Therefore, an access method is provided which increases the probability that higher priority packets may be delivered within a prescribed time even in case of a high utilization of the network (compliance with a "worst case" or prescribed latency may be enabled).

In an advantageous implementation of the method, the PHY component assumes that the priorities in the next communication cycle are identical to those in the last cycle. This assumption is particularly true if messages to be transferred are split into multiple smaller packets for transfer. In other words, if a second communication participant transmits a data packet from which a high priority value is determined in a first communication cycle, then it may be assumed that the second communication participant transmits a data packet having the same high priority also in a second communication cycle. If the first communication participant holds a low-priority packet ready for transmission in the second communication cycle, the first communication participant may omit transmitting in the second communication cycle. In this way, the second or a further communication participant may advantageously, if in contrast to other communication participants, it holds high-priority data packets ready for transmission, transmit the same immediately via the shared transfer channel, since other communication participants holding lower priority data packets ready for transmission omit transmitting these lower priority data packets in a respective communication cycle. In other words, an arbitration method provided in this way is enabled through a voluntary restriction of transmitting lower priority data packets. However, if the second communication participant transmits a data packet in the second communication cycle from which the first communication participant determines a lower priority value, the first communication participant may also transmit its lower priority data packet in the second communication cycle, since in this case the priority or importance of the data packets of both communication participants is the same.

In a further development of the method according to the invention, it is intended that a storage of the respectively last determined priority values from data packets of different communication participants, which are assigned to different communication participants, is performed. In other words, the determined priority values of the other communication participants may be stored in the PHY component, for example. For example, the respective priority values may be determined from the determined received data packets and the remaining data of the data packets may be deleted if they are not directed to the receiving communication participant. Advantageously, this may reduce an amount of data stored. In another embodiment it is possible that only the highest priority value determined is stored. If, for example, a priority value 5 is determined by a data packet of a second communication participant and a priority value 7 is determined by a subsequently received data packet of a third communication participant, the priority value 5 may be replaced or overwritten by the priority value 7. In this way, it is advantageously sufficient to store only one single priority value to perform the method. In particular, here it is taken into account that in some cases it may be irrelevant which one of the further communication participants holds higher priority data packets ready for transmission.

In a further development of the method, the own data packet (e.g. that one of the first communication participant) is transmitted depending on the highest priority value assigned to a further communication participant, which is, determined from respective data packets, stored by different communication participants. In this way, the method may be realized advantageously by storing and using only the highest determined priority value, as described above. In case that all communication participants participating in a communication via the shared transfer channel use the respectively highest priority value, the transfer channel may be provided to the respective communication participants in a prioritized order according to the priority of the same. In this way, the transfer channel is autonomously distributed independently between the communication participants according to the priority of their data packets to be transmitted.

A further development of the method according to the invention comprises comparing the priority value assigned to a further communication participant with a first priority value assigned to the first communication participant, wherein the data packet is transmitted by the first communication participant if the first priority value is at least as high as the highest priority value assigned to a further communication participant. In other words, the first communication participant compares the priority value of the data packet that it holds ready for transmission with a priority value of a further communication participant. For example, the first communication participant has previously stored the priority value received from the second communication participant as the highest one. If the comparison shows that the priority value of the first communication participant is as high as that one of the second communication participant, the first communication participant may transmit the data packet. If in this case the values of the priorities of the communication participants remain the same, the first communication participant may, for example, transmit data packets alternately with the second communication participant. The advantage of this is that in this way, the two communication participants holding more important data packets ready for transmission may transmit the same alternately without any time delay caused by less important data packets.

In a further development of the method, the first priority value is determined from a data packet last transmitted by the first communication participant via the shared transfer channel. In other words, the first communication participant determines its own priority value in the same way as it also determines the priority values of the further communication participants. The advantage of this may be that the determination may be performed particularly easily and without any further technical changes to the first communication participant. In this further development it may be intended, for example, that the first priority value is stored in addition to a highest priority value of the further communication participants. In this way it is always possible to compare whether the first priority value is lower or at least as high as the highest priority value. Depending on this, a data packet may be transmitted or held back by the first communication participant.

In a further development of the method, the first priority value is transmitted onto the shared transfer channel in a separate data packet after a predetermined number of transmitted data packets. A separate data packet may be such a data packet that contains only one priority value, e.g. the first priority value. In contrast to a data packet described above which may contain the priority value in addition to further information data, a separate data packet may be particularly small. For example, it may have a data size of 3 bits if priority values between zero and seven are provided. It may also have a data size of only 1 bit if priority values of zero and one are provided. In particular, all further communication participants may also transmit separate data packets after the predetermined number of transmitted data packets. For example, the predetermined number of transmitted data packets may be selected in a way that the separate data packet, and/or all separate data packets, are transmitted after each data packet transmitted via the transfer channel. In this example, for example, a second communication participant may first transmit a regular data packet and subsequently the first communication participant and all further communication participants may transmit separate data packets in order to thereby communicate to the respective other communication participants the priority value of their data packet ready for transmission. The advantage of this is that in case a communication participant is provided with a high-priority data packet, it does not have to wait for an entire communication cycle before it may transmit the data packet. The advantage of this is that in this way, very important data packets may be transmitted particularly quickly and, for example, a mode in which only one communication participant transmits data packets may be interrupted even before all high-priority data packets of the communication participant are transmitted.

In other embodiments, the predetermined number of transmitted data packets may be selected in such a way that the separate packets may be transmitted respectively after a complete transmission cycle or after half a transmission cycle or after a predetermined number of transmission cycles, for example two or three transmission cycles. The predetermined number may for example also be set adaptively, for example in a certain situation in which communication participants frequently transmit high-priority data packets, the separate data packet may be transmitted after each data packet, and in a situation in which high-priority data packets are transmitted only irregularly, the separate data packet may be transmitted after a transmission cycle. The predetermined number may, for example, also be adjusted adaptively depending on the utilization of the transfer channel.

In a further development of the method, the first priority value corresponding to a data packet that has a highest priority in a queue of data packets to be transmitted of the first communication participant is transmitted in the separate data packet. The advantage of this is that the current priority value is transmitted respectively. If a priority value in a previously transmitted data packet of the first participant has a low value, but the next one according to the queue of data packets to be transmitted respectively has a high priority value, the first communication participant may communicate to the further communication participants that it holds an important data packet ready for transmission.

In a further development of the method, the first priority value is determined from an information signal received by the first communication participant, wherein the information signal is provided by a device of the first communication participant which also provides the data packets to be transmitted. For example, data packets may be transmitted by a first device of the first communication participant, wherein the data packets are provided to the first device by a second device of the first communication participant. The second device may communicate the priority value of the next data packet to be transmitted to the first device through the information signal. Advantageously, thereby, the respective current priority value may be transmitted in the separate data packet, for example.

Here, an information signal may also be such a data packet that is to be transmitted next by the first communication participant. Here, the first device of the first communication participant may request the data packet to be transmitted from the second device, yet without transmitting it via the transfer channel. In order to use the data packet as an information signal, a conveyance from the second device to the first device may be interrupted by the first device even before a regular completion of the conveyance of the data packet to the first device. In other words, the conveyance may be interrupted, for example, at half or after a conveyance of 10%. In this case, it may be possible that the second device continues to hold the data packet ready as the next data packet to be transmitted and at the same time, the first device may determine the first priority value from the partially conveyed data packet. Thus, advantageously, an incomplete conveyance of a data packet in an internal conveyance of the first communication participant may be used to provide the information signal. Thereby the method may be improved.

In a further development of the method, it is intended that a transmission of a data packet by the first communication participant is omitted within a time frame intended for this purpose if the first priority value is lower than the priority value assigned to a further communication participant. Thus, if the first communication participant determines a priority value of a further communication participant that is higher than its own first priority value, the first communication participant omits transmitting the data packet until its own first communication priority value is at least as high as the highest priority value of a further communication participant. This applies in the same way (as well as the further described further developments of the method) to the further communication participants. If, for example, the second communication participant determines that the priority value assigned to the same is lower than the priority value determined by the second communication participant from a data packet of the first communication participant, the second communication participant omits transmitting a data packet until it determines that other communication participants are again transmitting data packets whose priority is equal to or lower than its own priority.

In a further development of the method, the first communication participant transmits a data packet if a further communication participant, which has transmitted a data packet of a priority value higher than the first priority value in a preceding communication cycle, does not transmit a data packet in a time slot assigned to the further communication participant. Thus, it is possible that in multiple consecutive transmission cycles or transfer cycles only one of the further communication participants, for example the second communication participant, transmits high-priority data packets, for example of the priority 7, since the other communication participants only hold ready lower priority data packets. The first communication participant observes the transmission period of the second communication participant. For example, the second communication participant may stop transmitting data packets when it has transmitted a message completely. In this case, the first communication participant may register that the second communication participant does not use its transmission time window. If this is the case, the first communication participant may transmit a data packet. In particular, the first communication participant may transmit its data packet even if the maximum priority value last determined by the first communication participant is higher than its own first priority value. The advantage of this is that the further development may for example allow a resumption of a transmission operation in which lower priority data packets are transmitted after a communication participant has been prioritized in another transmission operation due to the urgency of its message.

In a further development of the method, a communication bus of a motor vehicle is provided as the shared transfer channel. In this case, communication participants may be, for example, controllers having different functions that are provided in the motor vehicle or a vehicle, for example a truck or a motorcycle. It may be necessary for these controllers to communicate with each other, for example in order to coordinate the execution of their functions. The advantage of the further development is that this communication via a communication bus may be performed according to the method in such a way that the communication bus is used particularly efficiently. Efficient means that the communication bus is provided by the method to those publication participants that each hold a particularly important message ready for transmission in a data packet with a respective high priority. Furthermore, the advantage of the communication bus may be that also sensors of the motor vehicle may communicate with the controllers or other sensors according to the method. Here, notably information from sensors may have high priority in a moving motor vehicle.

A further aspect of the invention relates to a controller configured to control a transmission of data packets according to one of the preceding methods. Here, the controller has a maximum finder which is set up to determine and store a maximum external priority value from a predetermined number of received data packets. For example, the maximum finder of a first communication participant may be used to determine the priority value with which the priority value of the first communication participant is compared.

The controller is configured for the transmission of at least one data packet by a first communication participant, for example, via a transfer channel shared with at least one further communication participant. The controller is further configured to receive at the first communication participant, for example, at least one data packet from the at least one further communication participant via the shared transfer channel and to determine a priority value assigned to the further communication participant from the data packet. The controller is further configured for the transmission of the data packet by the first communication participant via the shared transfer channel depending on the priority value.

In a further development of the controller, the controller comprises a comparator which is configured to compare an own priority value with an external priority value. The own priority value is for example the first priority value, if the controller is already assigned to the first communication participant or if the controller is a component or a device of the first communication participant. The external priority value is, for example, a priority value assigned to a further communication participant. For example, the external priority value is the highest priority value determined from data packets of the further communication participants by the first communication participant. The advantage of the comparator is that the controller may determine by a comparison of whether a data packet is being transmitted or whether it is held back until the own priority value is at least as high as the external priority value.

A further aspect of the invention relates to a system with at least one controller according to the previous controller, wherein the system has at least one data control device corresponding to a controller, which is configured to provide data packets for transmission to the controller, the data control device further being configured to transmit to the corresponding controller an information signal having a priority value assigned to the controller.

A further aspect of the invention relates to a motor vehicle having a system according to the system described above and/or having at least one controller according to a controller described above, wherein the shared transfer channel is configured by a communication bus of the motor vehicle.

The invention includes also the further developments of the controller, system and motor vehicle according to the invention having one or more features as already described in connection with the further developments of the method according to the invention. For this reason, the corresponding further developments of the controller, system or motor vehicle according to the invention are not described again here, but are considered to be also disclosed for the same.

In the following, embodiments of the present invention are described in more detail with reference to the attached drawings, in which.

Figure 1:
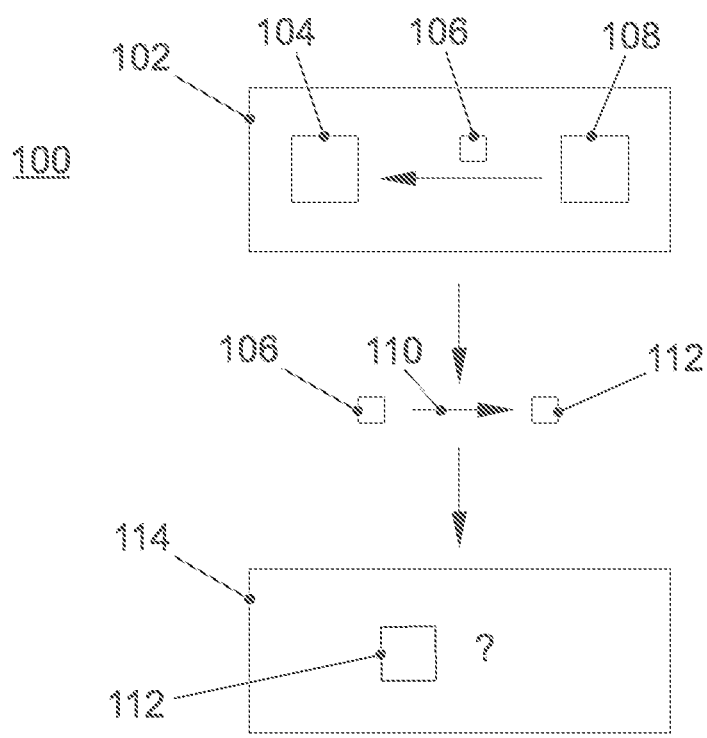
FIG. 1 shows an example of a method for transmitting a data packet.

FIG. 1 shows a method 100 for transmitting a data packet. The method 100 comprises receiving 102 of a first communication participant 104 of a data packet 106 from a further communication participant 108. The data packet 106 is used for determining 110 a priority value 112, which is assigned to the further communication participant 108. Thus, the first communication participant 104 may determine a priority value of a data packet 106 that the first communication participant has received from a further communication participant. The method 100 further comprises transmitting 114 a data packet by the first communication participant 104 depending on the priority value 112.

Figure 2:
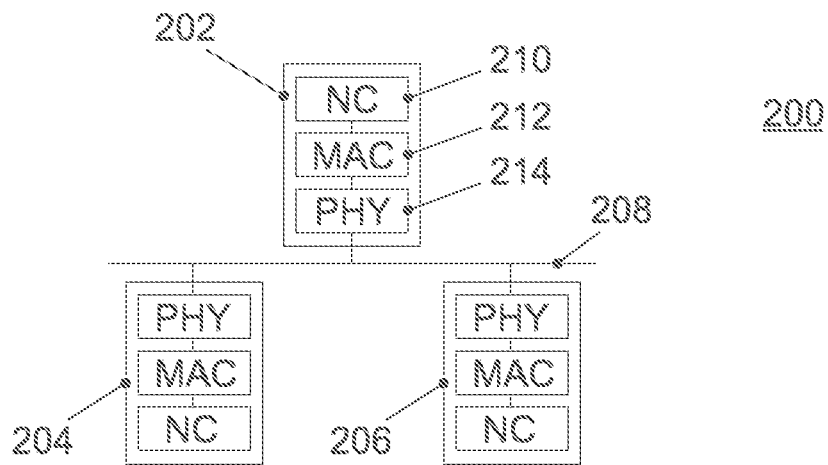
FIG. 2 shows an example with communication participants at a shared transfer channel.

FIG. 2 shows an example 200 with communication participants 202, 204, 206 at a shared transfer channel 208. The communication participants 202, 204, 206 are for example controllers of a motor vehicle and the transfer channel 208 is for example a communication bus of the motor vehicle. A communication participant, for example communication participant 202, may have a microcontroller 210, a MAC component 212 and a PHY component 214. The MAC component 212 may, for example, control a transmission of data packets via the transfer channel 208, wherein the PHY component 214 is provided with data packets to be transmitted by the MAC component 212. The MAC component 212 may provide the PHY component 214 with data packets to be transmitted of communication participant 202 depending on a priority for transmitting via the transfer channel 208. If, for example, the communication participant 202 holds data packets of different priorities ready for transmission, the data packets having the highest priority may be transmitted first.

Figure 3:
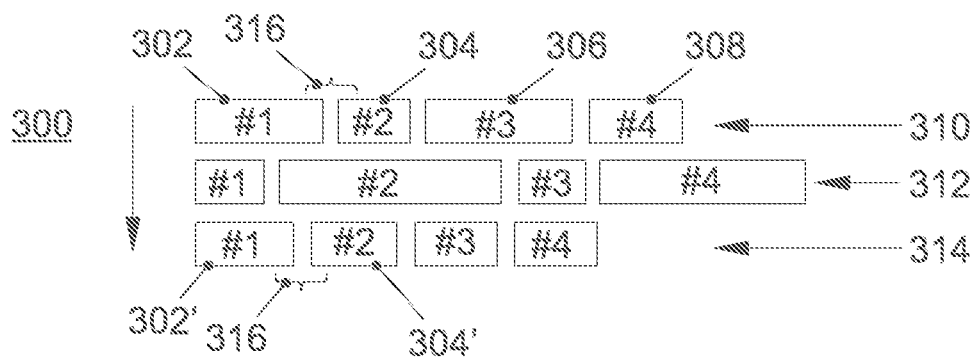
FIG. 3 shows an example of a transmission protocol with data packets of the same priority.

FIG. 3 shows an example of a transmission protocol 300 with data packets of a same priority. In the example, four communication participants #1, #2, #3 and #4 are provided, which respectively transmit data packets 302, 304, 306 and 308 one after the other in respective time windows assigned to them. Thus, in a first transmission cycle 310, a first communication participant transmits the data packet 302, subsequently a second communication participant transmits the data packet 304, then a third communication participant transmits the data packet 306 and finally a fourth communication participant transmits the data packet 308. Each of the communication participants determines a respective priority value from the data packets. Since in this example of the transmission protocol 300 all data packets have the same priority value, the four communication participants also transmit their respective data packets in a second transmission cycle 312 and in a third transmission cycle 314, one after the other, that is to say approximately equally distributed. Here, the data packets may have different lengths. For example, a length of the data packet 302' of the first communication participant in the third transmission cycle 314 may be shorter than the length of the previously transmitted data packet 302. The second communication participant may transmit its respective data packet 304 and/or 304' if a predefined transmission pause 316 has been awaited after the transmission of the data packets 302 and/or 302' of the first communication participant.

In FIG. 3, the different transmission time windows are disposed next to each other (which are assigned to the communication participants #1 to #4). One line corresponds to one communication cycle. Three communication cycles are illustrated in the figure. Between the transmission time windows there is a pause of a defined length with the help of which it may be recognized that the previous transmission is completed. The duration of a transmission time window depends on the amount of data transferred. If a network participant does not transmit any data, multiple pauses occur consecutively. This type of access method is called fair because all participants of the network have the same chance to transmit packets. This may be useful if all communication participants transmit data packets of a same priority.

Figure 4A:
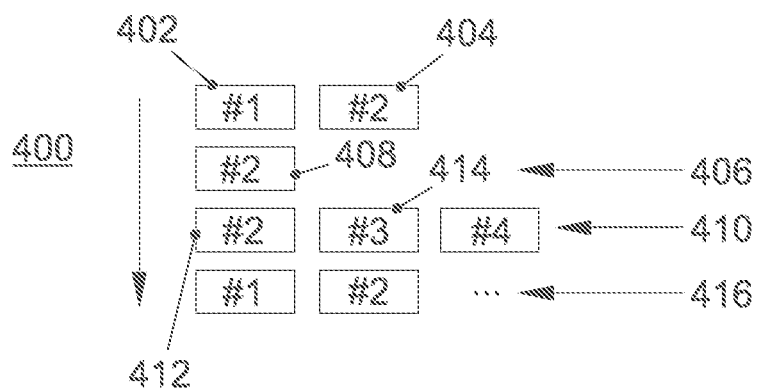
FIG. 4 shows an example of a transmission protocol with data packets of different priorities.

FIG. 4a shows an example of a transmission protocol 400 with data packets of different priority. For example, a data packet 402 of the first communication participant has a low priority and a data packet 404 of the second communication participant has a highest priority. In particular, here the highest priority is higher than the priorities of the data packets to be transmitted by the communication participants #3, #4 and #1. Thus, in a communication cycle 406, the further communication participants suspend transmitting their data packets, so that the second communication participant may immediately transmit a further important high-priority data packet 408. The transmission cycle is shortened by the fact that only the predefined transmission pauses have to be awaited, but no transmission time windows between the transmission pauses (which may exist between each data packet, for example in FIG. 3) are used by other communication participants. In a subsequent transmission cycle 410, a data packet 412 of the second communication participant has a low priority. It is determined at least by the third communication participant. Since the priority of the third communication participant is now as high as that of the second communication participant, the third communication participant transmits a data packet 414 in the transmission cycle 410. A transmission cycle 416 may correspond to the transmission cycle 310 of the previously described transmission protocol 300, for example if the priorities of the data packets of all communication participants are the same. In this way, it is shown how it is possible to switch between different transmission protocols due to the transferred priority values and how a communication participant with high-priority data packets may be given a preferential right to transmit its data packets through a decentralized decision of the further communication participants.

Figure 4B:
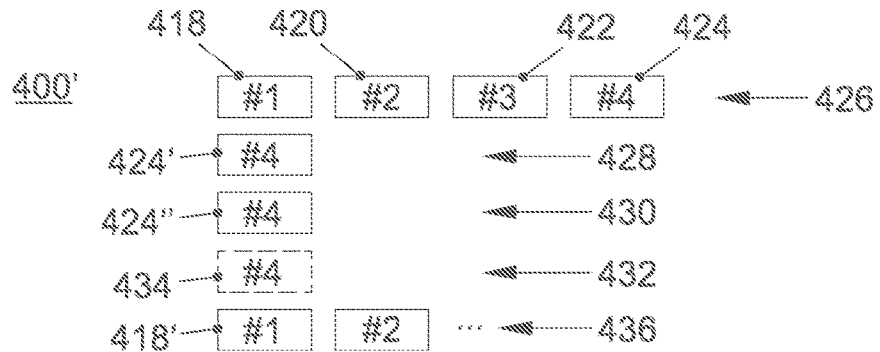

FIG. 4b shows an example of a transmission protocol 400'. In a first communication cycle 426, four communication participants transmit their respective data packets 418, 420, 422, 424 one after the other. The data packet 424 may have a higher priority than the remaining data packets 418, 420, 422. Thus, communication participants #1, #2, and #3 suspend transmission in the transmission cycles 428, 430, and 432, whereas in the transmission cycles 428, 430 only communication participant #4 transmits. In communication cycle 430, the message of #4 is completed with transmission of the data packet 424". Communication participants #1, #2, and #3 still do not transmit any data packet in cycle 432 since they still have stored the priority value 7 of #4. However, since communication participant #4 does not transmit any data packet within a time window 434 or time slot assigned to the it in cycle 432, communication participant #1 resumes transmitting data packets, for example data packet 418', in cycle 436. Although #1 still has stored the priority value 7, it may then transmit again a data packet 418' which has for example the priority value 5, since it has previously observed the time window 434 of communication participant #4 and was able to determine that #4 does not transmit any further message. In this way, for example, a high-priority transmission mode may be returned to a lower priority transmission mode when a high-priority message has been completely transmitted and the communication participant having transmitted the high-priority message does not transmit any further data packets.

Figure 5:
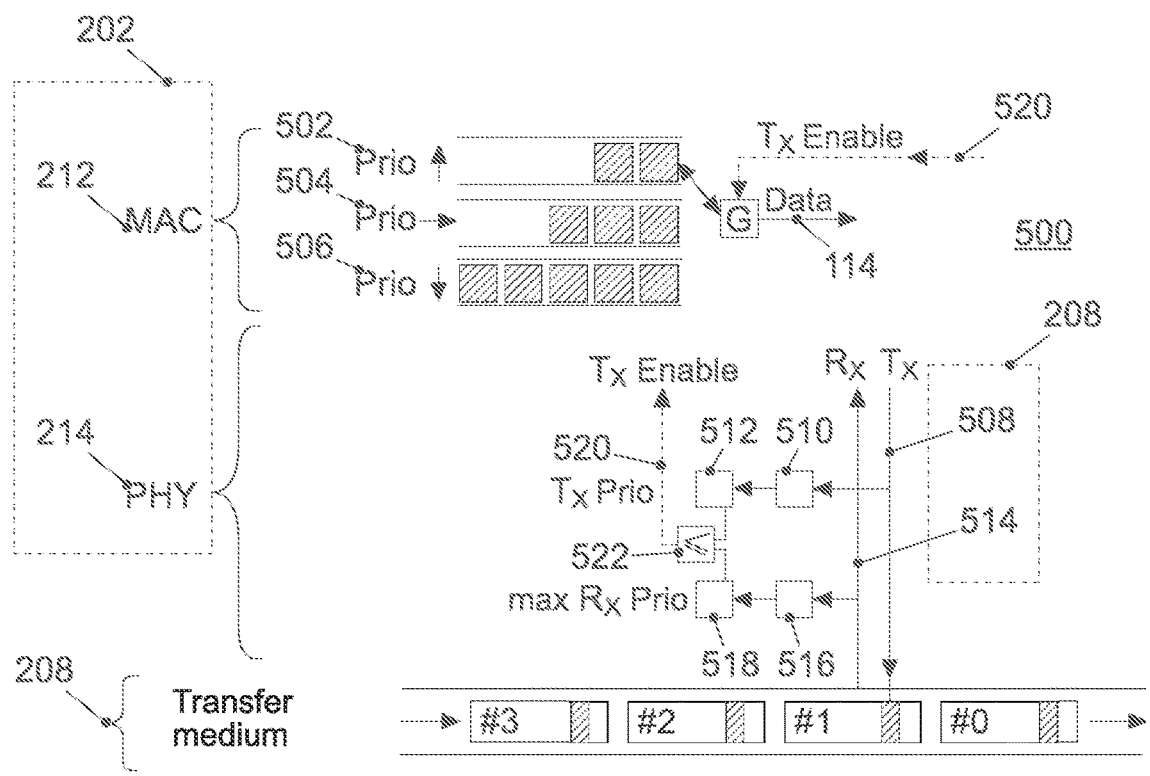
FIG. 5 shows an embodiment of a system.

FIG. 5 is an embodiment of a system 500 with a first communication participant 202, whose MAC component 212 provides high-priority 502, medium priority 504 and low priority 506 data packets to a PHY component 214. The PHY component 214 receives a first data packet 510 from a transmit path 508, from which the first priority 512 is determined. Here, the first priority value 512 corresponds to the priority value of a data packet of the communication participant 202. From a receive path 514, the first communication participant receives a data packet 516 of another communication participant that transmits data packets via the transfer channel 208. The PHY component 214 determines a priority value 518 from the data packet 516. In a comparison 522 it may be determined, for example, that the first priority value 512 is as high as the priority value 518. In this case, the PHY component may communicate to the MAC component in an enable signal 520 that a data packet, for example of the high priority 512, may be transmitted. On the basis of this information, the communication participant 202 may perform a transmission 114 of a data packet.

It is possible that high-priority data packets may be transferred preferentially and that packets of other participants that are ready for transmission are respectively held back by the same. Thus, participant 202 observes the data on the transfer channel 208 and stores for example the highest observed priority value 518 of the last communication round. This means: If the participant is allowed to transmit in a time window n, it evaluates the priority information from the time windows starting from n+1 of the last communication cycle as well as the time windows up to n−1 of the current communication cycle. The PHY 214 transmits its data packet only if the priority of its own packet is as high or higher than the highest observed priority of another communication participant. If the priority 512 of the own packet is lower, it renounces the right to transmit and thus does not block the common communication channel 208 with a low-priority packet. The advantage of having all participants in the network transmit data packets according to the method is that high-priority messages (consisting of multiple data packets) may be transferred without being interrupted by low-priority packets.

The method described so far is comparatively easy to realize in an Ethernet system, since it only relates to one arbitration method within the PHY. Here, only minor changes to an existing PHY component are necessary: Providing a functionality to extract the 3-bit priority field from the data stream of the received and transmitting data (since according to IEEE 802.1Q the information is always at the same position in the data packet, it may be read out efficiently); providing a functionality to determine and store the maximum value of all received packets of the last cycle; providing a functionality to store the priority value of the packet last transmitted; providing a functionality to withdraw the release to transmit from the MAC if the own priority is less than the received maximum value, for example through an enable signal 520.

Figure 6:
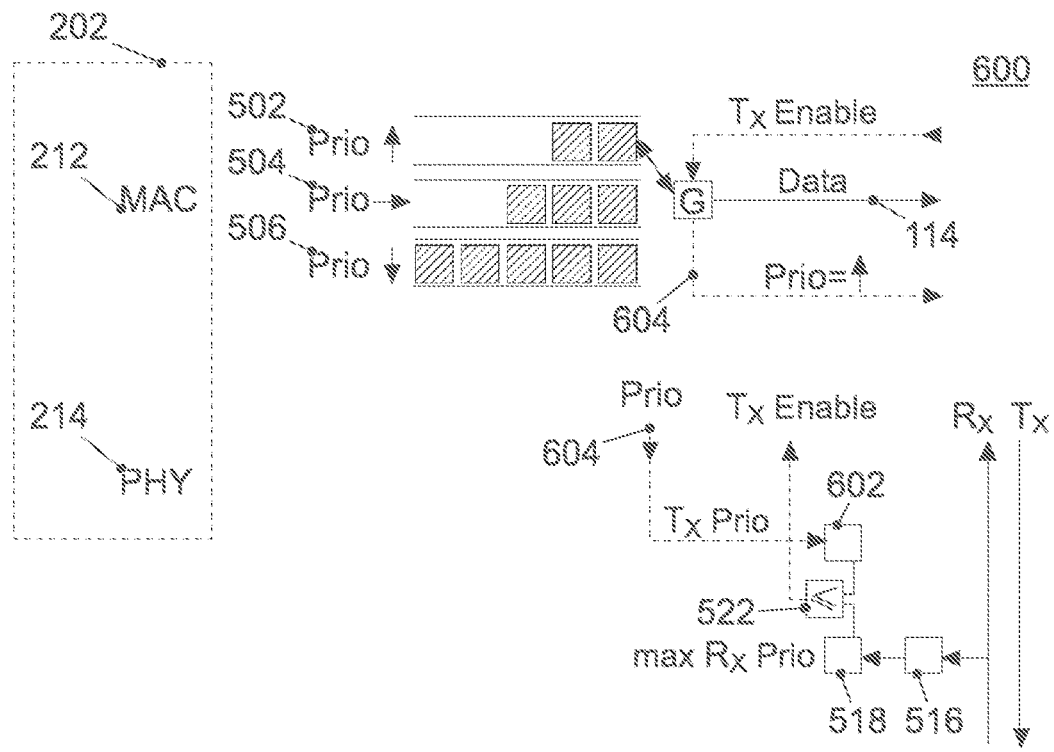
FIG. 6 shows an embodiment of a system.

FIG. 6 shows an embodiment of a system 600. In contrast to system 500, a first priority value 602 of the PHY component is provided by the MAC component in a priority signal 604. Thus, the communication participant 202 of the system 600 is configured in such a way that a first priority value of a data packet to be transmitted by the communication participant 202 does not have to be determined from a transmitted data packet, but may be provided through the priority signal. In a comparison 522 of the first priority value 602 and the priority value 518 of another communication participant, it may be determined, for example, that the first priority value 602 is higher than the priority value 518, so that a transmission 114 of a data packet may be executed by the first communication participant 202.

Thus, in this example it is intended that the MAC transmits information about the priority of the next frame to be transmitted to the PHY. This allows the PHY to make the decision not only based on the packet last transmitted, but also on the currently upcoming packet. This improvement is particularly beneficial when a participant transmits both low-priority packets and high-priority packets, which is a frequently encountered communication behavior. Through an execution according to system 600, a latency when transmitting the first high-priority packet may be avoided, since the PHY is already informed about the priority of the next data packet ready for transmission.

This may require a change to an existing MAC. With the help of an additional signal 604, the priority scheduler hands over the priority of the next message ready for transmission to the PHY even before the actual transfer of data takes place. The PHY uses the priority information from the signal instead of the priority information from the message last transmitted. Different methods are possible to transfer the priority information from the MAC to the PHY: The Ethernet specification IEEE 802.3 provides for a serial communication interface between MAC and PHY. By means of the signals MDIO and MDCC, the PHY may access internal registers of the PHY. By a write access to a respective register, the MAC may communicate the priority information to the PHY. Within the data stream of the MII interface between MAC and PHY (according to IEEE 802.3), additional information may be transferred, which is received by the PHY and not transmitted to the transfer medium. This may take place, for example, before or after transfer of an Ethernet message. A separate interface between MAC and PHY may be provided for the transfer of the priority information. This may be for example a 3-bit parallel interface or serial interface via a separate terminal.

In an embodiment, it is possible to convey an information signal from the MAC component to the PHY component without changes to an existing MAC component being required. For this purpose, it may be possible that the PHY component grants a transmission permission to the MAC component, yet without actually transmitting the data via the transfer channel. The MAC component then begins to convey the next data packet to be transmitted to the PHY component.

As soon as the PHY component has received the priority field (which may always be located at the same position, relatively far at the beginning of the header), i.e. such a large part of the data packet has been conveyed that the PHY component may determine the priority value of the data packet therefrom, the PHY component interrupts the conveyance (in other words, the PHY component withdraws the transmission permission from the MAC component even before the data packet has been completely conveyed). Since the MAC component has conveyed the frame or the data packet incompletely to the PHY component, the affected data packet remains at the front of a queue (e.g. the transmit queue) of the MAC component and when the next transmission permission is granted, it is tried again to convey this frame (this data packet) completely to the PHY component. However, after the interruption of the conveyance, the priority value of the next frame ready for transmission (the next data packet) is available to the PHY component. The PHY component may, for example, compare a priority value determined by a further communication participant or communicate the priority value determined according to the example to the further communication participants, for example by means of a separate data packet.

Figure 7:
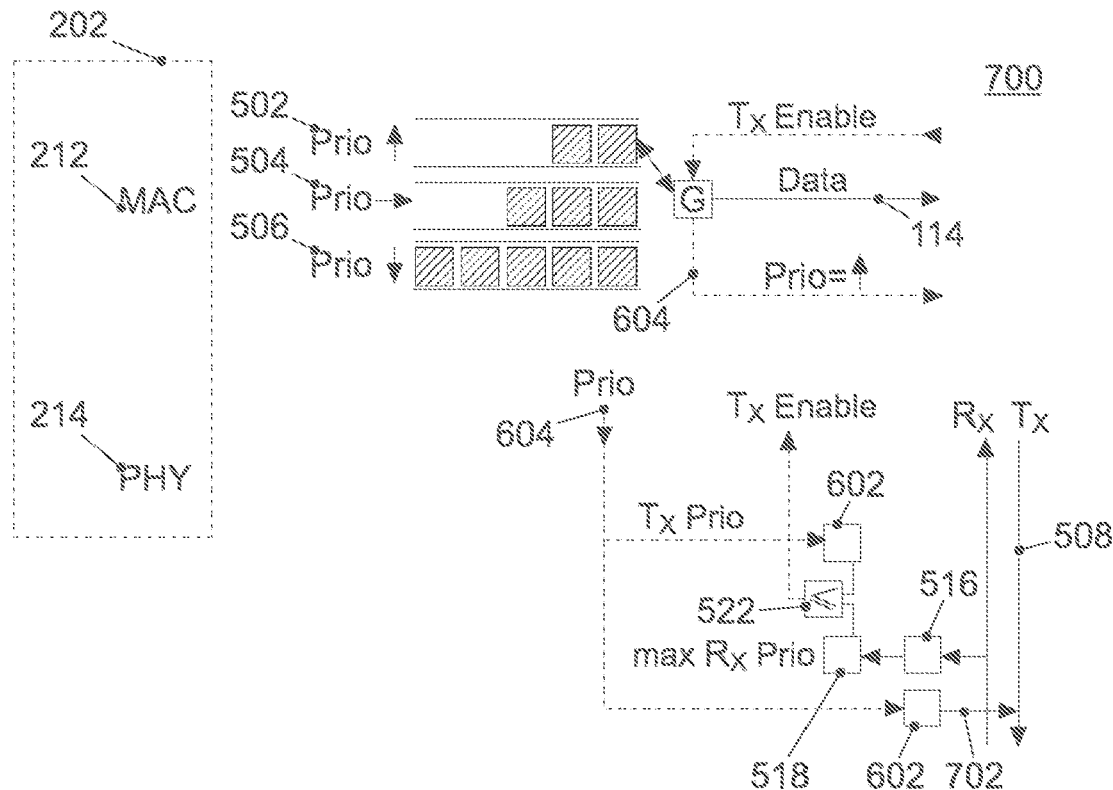
FIG. 7 shows an embodiment of a system.

FIG. 7 shows an embodiment of a system 700. System 700 may be considered as a further development of system 600, wherein the priority signal 604 is not only used to compare priority 602 with priority 518 in a comparison 522, but also to provide priority 602 to the further communication participants, for example in a separate data packet 702 via the transmit path 508 of transfer channel 208.

This enables a network participant to convey an indication of the priority of the next upcoming message to the other or further network participants. Instead of assuming that the priority of a message of another participant in the current communication cycle corresponds to the priority in the previous cycle, a participant is able to transfer the priority of the presumably next message in addition to the priority of the current message, according to the design of system 700. For that, the PHY transmits an additional message, such as the separate data packet 702, to the transfer medium (transmit path 508), in which it transfers the priority of the next message ready for transmission. There are several conceivable methods for transferring the priority message: Directly after the transfer of a message, within the same transmission time window; in a separate communication cycle in which the network participants only transfer priority information and no user data. This priority communication cycle may either take place between two regular communication cycles or be integrated after each regular message.

The size of the priority information is very small at about three bits, i.e. a separate data packet 702 may be small. When using the first method, this results in only a very small additional load on the communication medium, whereas a method for transmitting a data packet may be considerably improved.

By using the method, the prediction quality may be improved, since the network participant may transfer the priority of its upcoming message at a later time. Priorities may be enforced most effectively if such a communication cycle is integrated after each regular time window. However, the separate communication cycle causes additional pauses between the additional transmission time windows. If the priority information is transmitted very frequently, the bandwidth of the network available for payload decreases.

If a high-priority message reaches the MAC during transfer, the network participant may communicate an indication of the high priority immediately after the transfer is completed. The network participants with lower priority would thus renounce their transmission right and the high-priority message may be transmitted promptly.

In general, the present application relates to an arbitration strategy by means of a PHY component. The application relates to a method of how the prioritization of the elements scheduled (planned) by the Strict Priority Scheduler in a system consisting of Strict Priority Scheduler and downstream Weighted Round Robin Scheduler may be enforced.

It may be advantageous to provide a 10 Mbit Ethernet for use in automobiles to interconnect vehicle components. For a 10 Mbit Ethernet Physical Layer (PHY) in electronic architectures in vehicles, a bus topology with this Physical Layer (PHY) may be enabled. This also requires a suitable arbitration method to determine which participant obtains bus access at what time. Some arbitration methods may guarantee each participant or communication participant regular access to the bus by handing over a virtual baton, so to speak. However, such methods may have the disadvantage that a Weighted Round Robin between the participants may make a prioritization of messages which is necessary in the automotive field impossible. Message prioritization may be necessary to treat messages requiring very short delivery times preferentially in the network and thus to be able to comply with prescribed delivery times. The method provided in this application allows compliance with prescribed transfer times. Thus, the presented method may enable decentralized prioritization with respect to transmission of data packets by independent communication participants via a shared transfer channel.

In general, the method may be deployed in all interconnected electronic controllers. The networking requirements of electronic devices, for example in an automobile or motor vehicle, may necessitate the use of 10 MBit Ethernet or a comparable technology. Furthermore, a connection of sensors may be provided via a 10 MBit Ethernet (e.g. in the context of sensor data fusion or a microphone connection). The method may be deployed in the field of industry and industrial automation technology. Furthermore, it may be used in the field of home automation technology.

LIST OF REFERENCE NUMERALS

100 method
102 receiving
104 first communication participant
106 data packet
108 further communication participant
110 determining
112 priority value
114 transmission
200 example
202 first communication participant
204 second communication participant
206 third communication participant
208 transfer channel
210 microcontroller
212 MAC component
214 PHY component
300 transmission protocol
302 data packet of a first communication participant
304 data packet of a second communication participant
306 data packet of a third communication participant
308 data packet of a fourth communication participant
310 first communication cycle
312 second communication cycle
314 third communication cycle
400 transmission protocol
402 data packet of a first communication participant
404 data packet of a second communication participant
406 communication cycle
408 high-priority data packet
410 communication cycle
412 low-priority data packet
414 data packet of a third communication participant
416 communication cycle 500 system
502 high priority
504 medium priority
506 low priority
508 transmit path
510 first data packet
512 first priority
514 receive path
516 data packet of a further communication participant
518 priority value
520 enable signal
522 comparing
600 system
602 first priority value
604 priority signal
700 system
702 separate data packet

The invention claimed is:

1. A method for transmitting at least one data packet from a first communication participant via a transfer channel shared with at least one further communication participant, wherein data packets are transmitted by the communication participants according to a Round-Robin method, the method comprising:
receiving by the first communication participant of at least one data packet from the at least one further communication participant via the shared transfer channel and determining a priority value from the data packet assigned to the further communication participant,
wherein the at least one further communication participant is configured to transmit data packets with different priority values; and
transmitting the data packet by the first communication participant via the shared transfer channel depending on the priority value.

2. The method of claim 1, further comprising:
storing the respectively last determined priority values from data packets of different communication participants which are assigned to different communication participants.

3. The method of claim 2, wherein the data packet is transmitted by the first communication participant depending on the highest priority value assigned to a further communication participant, which is stored as determined from respective data packets from different communication participants.

4. The method of claim 1, the method further comprising:
comparing the priority value assigned to a further communication participant with a first priority value assigned to the first communication participant,
wherein the data packet is transmitted by the first communication participant if the first priority value is at least as high as the highest priority value assigned to a further communication participant.

5. The method of claim 1, wherein the first priority value is determined from a data packet last transmitted by the first communication participant via the shared transfer channel.

6. The method of claim 1, wherein the first priority value is transmitted via the shared transfer channel in a separate data packet after a predetermined number of transmitted data packets.

7. The method of claim 6, wherein the first priority value corresponds to a data packet having a highest priority in a queue of data packets to be transmitted of the first communication participant.

8. The method of claim 1, wherein the first priority value is determined from an information signal received by the first communication participant, wherein the information signal is provided by a device of the first communication participant which also provides data packets to be transmitted.

9. The method of claim 1, wherein a transmission of a data packet by the first communication participant is omitted within a time frame intended for this purpose if the first priority value is lower than the priority value assigned to a further communication participant.

10. The method of claim 1, wherein the first communication participant transmits a data packet if a further communication participant, which in a preceding communication cycle has transmitted a data packet of a priority value higher than the first priority value, does not transmit any data packet in a time slot assigned to the further communication participant.

11. The method according to claim 1, wherein a communication bus of a motor vehicle is provided as the shared transfer channel.

12. A controller configured to transmit at least one data packet from a first communication participant via a transfer channel shared with at least one further communication participant, wherein data packets are transmitted by the communication participants according to a Round-Robin method, the controller further configured to:
receive by the first communication participant of at least one data packet from the at least one further communication participant via the shared transfer channel and determine a priority value from the data packet assigned to the further communication participant,
wherein the at least one further communication participant is configured to transmit data packets with different priority values;
wherein the controller has a maximum finder which is configured to determine and store a maximum priority value from a predetermined number of received data packets; and
transmit the data packet by the first communication participant via the shared transfer channel depending on the priority value.

13. The controller of claim 12, the controller having a comparator configured to compare a priority value assigned to the controller with a priority value assigned to another communication participant.

14. A system with at least one controller according to claim 12, the system having at least one data control device corresponding to a controller configured to provide data packets to the controller for transmission, the data control device further being configured to transmit an information signal having a priority value associated with the controller to the corresponding controller.

15. A motor vehicle comprising at least one controller according to claim 12, wherein the shared transfer channel is formed by a communication bus of the motor vehicle.

16. A motor vehicle comprising a system according to claim 14, wherein the shared transfer channel is formed by a communication bus of the motor vehicle.

* * * * *